INTEGRATOR

Filed July 12, 1949

INVENTORS
WILLARD J. OPOCENSKY
& LEWIS W. IMM
BY Naylor and Lassagne
ATTORNEYS

Patented July 8, 1952

2,602,338

UNITED STATES PATENT OFFICE 2,602,338

INTEGRATOR

Willard John Opocensky, Glendale, and Lewis William Imm, Los Angeles, Calif., assignors to Librascope, Incorporated, Burbank, Calif., a corporation of California Application July 12, 1949, Serial No. 104,296

8 Claims. (Cl. 74—198)

The present invention relates to computing integrators which constitute a particular species of variable speed transmission particularly useful in computing mechanisms because they are capable of being constructed to maintain precise relationships between input and output shaft speeds.

The design of computing integrators presents problems not encountered in the design of variable speed transmissions as a general class since, in the latter, minor amounts of irregular slippage are of no importance so long as the general relationship between input and output speeds contemplated by the design is approximated. However, in a computing integrator, the maintenance of a precise relationship between the rate of rotation of the input shaft and that of the output shaft is of the utmost importance, and the degree of precision achieved constitutes an index of the utility of the device as an element of complex computing mechanisms which frequently employ a plurality of computing integrators such as, for instance, the fire control device of the Baker et al. Patent No. 2,426,584, dated September 2, 1947 (Class 235—61.5).

Computing integrators have been constructed in a variety of forms, but in the conventional form illustrated herein as an example of one form in which the present invention may be embodied, the integrator consists essentially of a rotatable disk carried by an input shaft, a rotatable cylinder carried by an output shaft and disposed on an axis normal to the axis of the disk, and a pair of contacting balls engaging the disk and cylinder, respectively, and adjustable along a path diametrical of the disk and paralleling the axis of the cylinder. For the purpose of such adjustment, the balls are contained in a sleeve mounted for movement in the described path and connected to the ball carriage input shaft.

In operation, an integrator of this general type functions to transmit rotation of the disk through the contacting balls to the cylinder, the rate of rotation of the cylinder with respect to any given rate of rotation of the disk being variable from zero when the balls are at the center of the disk to a maximum in either direction when the balls are at the one or the other of their extreme outward positions with respect to the disk.

The structure thus far described is conventional, as are other forms thereof such as, for instance, modifications employing a single ball instead of a pair of balls between the disk and cylinder. However, in all such forms the impositive or frictional character of the drive connection between the input and output has resulted in irregular slippage, increasing in magnitude with the output torque imposed, and it has not been possible to obtain an output torque of sufficiently high magnitude without incurring such loss of precision as to impair the usefulness of such mechanisms in computing devices. The term "precision" as used in this discussion connotes a constancy of relationship between output and input under variant conditions of imposed torque upon the output, rather than any total absence of slippage between the output and input, since a certain amount of slip is inherent in all mechanisms of this type but is relatively unimportant so long as the magnitude of the slip is constant under variant conditions of imposed torque.

Prior attempts to enhance the precision of computing integrators have led designers thereof to provide progressively larger and heavier devices of this class requiring similar proportioning of the associated computing instrumentalities and greatly increasing the driving power required for the operation of mechanisms employing such devices. According to the present invention, however, a computing integrator of only one-fifth the size of those previously in general use has been constructed and has been found to achieve precision of a magnitude greater than experts in the field previously believed feasible in a computing integrator of any size.

The present invention is based upon the discovery that the magnitude of torque transmissible can be very greatly increased in devices of this character without incurring the liability of irregular slippage between the driving and driven surfaces, by applying to certain of the contacting driving surfaces a superfinish exceeding in smoothness any finish heretofore deemed desirable as a mere matter of mechanical design and by making these surfaces of materials of a hardness sufficiently great to support unit pressures of a magnitude far exceeding the unit pressures heretofore deemed expedient as a mere matter of mechanical design.

It is believed, on the basis of the evidence available at the present time, that the superfinish employed in carrying out the present invention and hereinafter more particularly described, is sufficiently high to bring into play the forces of molecular adhesion between the contacting surfaces in addition to the ordinary frictional forces present, and thus to make possible the transmission of higher torque without slippage than would be possible were such ordinary frictional forces relied upon alone for the transmission of such torque. The phenomenon of molecular adhesion is familiar in superfinished gauge blocks and the like which adhere or "wring" together, and it is recognized that the forces of molecular adhesion, if present, are insignificant until superfinishes to surface accuracies of the order of one micro-inch or less have been imparted to the contacting surfaces.

We have also found that such superfinishing makes possible the employment of very hard material, such as cemented carbides, for certain of the contacting surfaces, and this is also important to the present invention, since the use of such materials makes possible the employment of heavier compressive forces for holding the driving surfaces in contact than would be possible with softer material; it being known that exceedingly hard materials of the character of cemented carbides are able to withstand much greater unit pressures than materials such as the hardest alloy steel without risk of exceeding the elastic limit or ultimate static strength of the material. Furthermore, because polishing and superfinishing effect a breaking off of the points of the individual grains of cemented carbides, or carbides compressed into solid form, the smooth and polished surfaces thereof will not scratch steel unless bearing on it with much greater pressures than even the high unit pressures of five hundred thousand pounds per square inch which are effective between certain surfaces in the instrument herein described.

These considerations have found practical application in the integrator construction described in detail hereinafter as a preferred embodiment of the present invention, reference being had to the accompanying drawings, in which.

Figures 1, 2, 3:
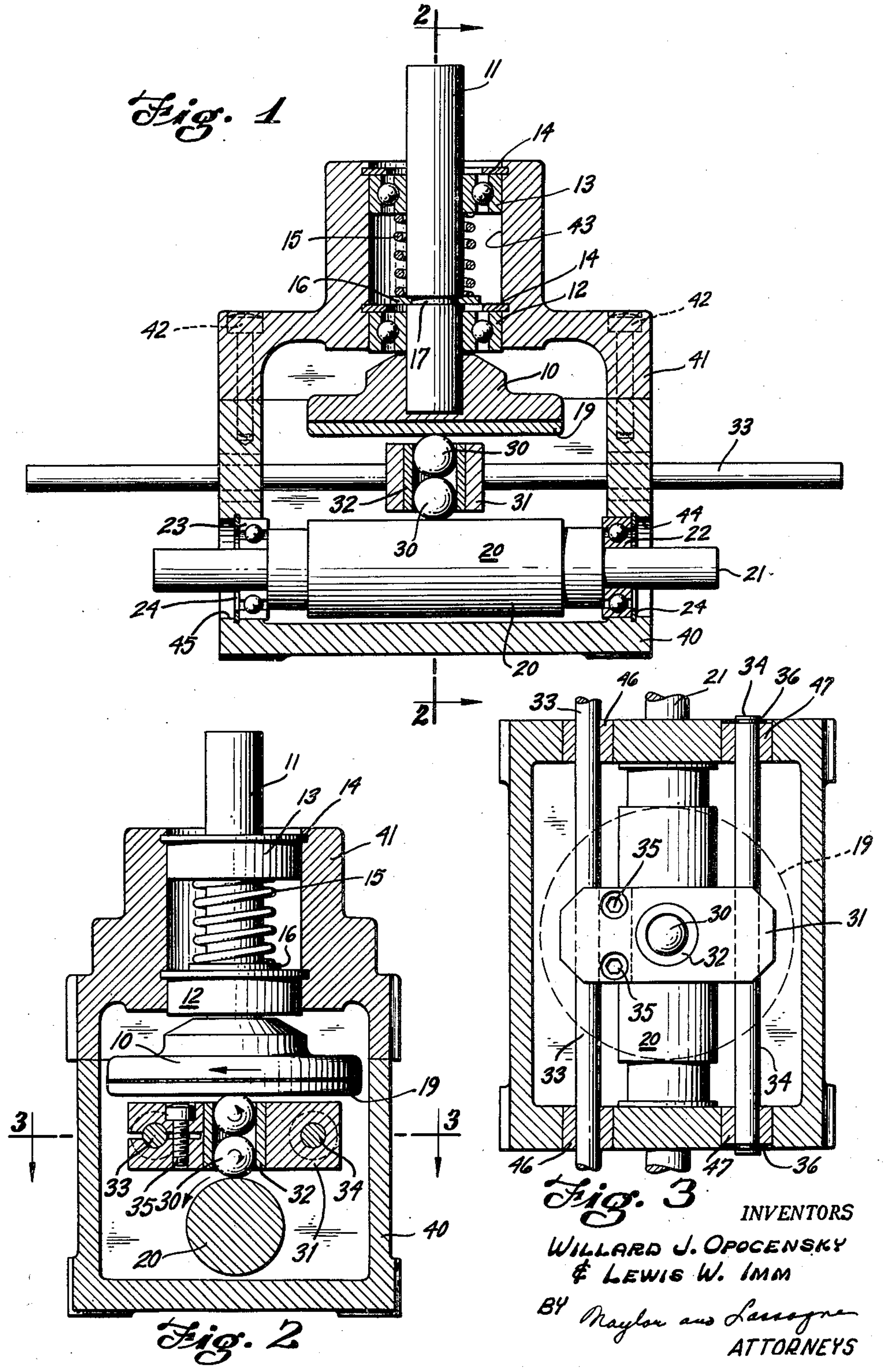
Figure 1 is a side view in section of an integrator embodying the present invention with certain elements of the mechanism shown in full for clarity.
Figure 2 is a transverse sectional view of the integrator taken on the line 2—2 of Figure 1.
Figure 3 is a plan view in section, the section being taken on the line 3—3 of Figure 2.

Referring to the accompanying drawing, the illustrated embodiment of the present invention comprises a rotatable disk 10 secured to an input shaft 11; a rotatable cylinder 20 carried by an output shaft 21 and disposed on an axis normal to the axis of the disk 10, and a pair of contacting balls 30 engaging the disk 10 and cylinder 20, respectively, and adjustable along a path diametrical of the disk 10 and paralleling the axis of the cylinder 20 by means of a ball carriage 31 having a sleeve 32 secured therein and closely fitting the balls 30 and secured to a ball carriage input shaft 33 axially adjustable in a path paralleling the axis of the output shaft 21.

In view of the high compressive force exerted upon the balls 30, as hereinafter explained, it is important that the balls 30 be very closely constrained to a position in which a line drawn through their contact with each other, with the disk 10, and with the cylinder 20, is parallel to the axis of shaft 11. At the same time, the sleeve 32 which constrains the balls 30 to this position should impose a minimum friction load on the balls. For example, where balls having a diameter of .250000 plus or minus .000025 of an inch have been used, the inside diameter of sleeve 32 has been held to .2502 plus .0002 minus .0000 of an inch with good results. In order that the sleeve 32 shall impose a minimum friction load on the balls, and have a satisfactorily extended life under ordinary conditions of use, the lining of the sleeve has been constituted of a plating of hard chromium of .003 of an inch minimum thickness, superfinished to a smoothness of 2 micro-inches, and this has been found eminently satisfactory.

These principal elements of the integrator are mounted in a casing comprising a housing base 40 and a housing cap 41 secured to the base by means such as screws 42 passing through holes preferably countersunk at their upper ends, as shown, in the housing cap 41 and engaging threaded holes in the housing base 40.

The disk 10 and input shaft 11 are rotatably mounted in the housing cap 41 by means such as ball bearing and race assemblies 12 and 13 retained against movement outwardly of the housing cap 41 by arcuate spring metal retainers 14 seating in circular recesses within a central bore 43 of the housing cap 41.

Output shaft 21 is rotatably mounted in the housing base 40 in a generally similar manner by means of ball bearing and race assemblies 22 and 23 retained against movement outwardly of the housing base by arcuate spring metal retainers 24 seated in circular grooves in each of two axially aligned horizontal bores 44 and 45 in the housing base 40.

The ball carriage 31 is supported within the housing base 40 by parallel shafts 33 and 34, being secured to shaft 33 as by screws 35 adapted to compress bifurcate portions of the ball carriage 31 against opposite sides of the shaft 33 and being slidably mounted upon shaft 34. Shaft 33 constitutes a ball carriage input shaft, being slidably mounted in bushings 46 in the housing base 40, while shaft 34 constitutes a ball carriage guide shaft, being mounted in bushings 47 in housing base 40 and secured against axial displacement by means such as arcuate retainers of spring material 36 seated in circular recesses in shaft 34.

A coiled spring 15 compressed between the inner race of the upper ball bearing and race assembly 13 and an arcuate spring clip 16 retained in a circular groove 17 in input shaft 11 exerts a relatively strong pressure through disk 10 against balls 30 and cylinder 20, so that upon rotation of the input shaft 11 with the ball carriage 31 positioned so that the balls 30 are at any place between the exact center of the disk 10 and its edge, such rotational movement will be imparted to the cylinder 20 and output shaft 21 through the balls 30.

In order to obtain maximum torque transmission between the input shaft 11 and the output shaft 21 of an integrator of the type above described without loss of precision from irregular slippage, the compressive force exerted by the spring 15 should be as high as the strength of the materials affected by that force permits, but obviously it must never be so high as to stress either the face of the disk 10, the surfaces of the balls 30, or the surface of the cylinder 20 either beyond their respective elastic limits or their respective ultimate static strengths. The fact that the effective areas of contact between the disk and the upper ball; between the upper ball and the lower ball; and between the lower ball and the cylinder are extremely minute, means that extremely high unit pressures between these surfaces will be present, and that the relationship of these pressures to the strength of the materials employed for the disk, balls and cylinder, respectively, will determine the maximum pressure which can safely be exerted by the spring 15.

In view of the fact that cemented carbides, such as cemented tungsten carbide and cemented boron carbide, were known to have extremely high moduli of elasticity and extremely high compressive strengths, it was initially attempted in connection with the development work leading to the present invention to employ cemented tungsten carbide as a facing material for the disk 10, applying the same as indicated at 19, where a disk facing of cemented tungsten carbide is indicated as secured, as by silver solder, to the lower face of a steel disk 10. Employing a disk of this construction in conjunction with balls 30 of a diameter of .250 of an inch and a cylinder 20 of a diameter of .625 of an inch, the balls being of a forged alloy steel of chemical analysis

| | Per cent |
|---|---|
| C | 1.05–1.15 |
| Cr | .40– .60 |
| Mn | .25– .35 |
| Si | .25– .35 |
| S | .020 max. |
| P | .25 max. |

and the cylinder being of type "EZ" Nitralloy steel the chemical composition of which was

| | Per cent |
|---|---|
| C | .30– .40 |
| Mn | .50–1.10 |
| Si | .30 max. |
| Al | .75–1.50 |
| Cr | 1.00–1.50 |
| Mo | .15– .25 |
| S | .06 max. |

it was calculated that when the spring 15 was proportioned to exert a downward pressure of 13 pounds axially of the shaft 11, the maximum unit pressure at the concavo-convex circular contact between the disk facing 19 and the upper balls 30 reached a maximum of 459,316 pounds per square inch; that the maximum unit pressure at the flat circular contact between the two balls 30 reached a maximum of 559,374 pounds per square inch and averaged 372,339 pounds per square inch; and that the unit pressure at the concavo-convex elliptical contact between the lower ball 30 and the cylinder 20 attained a maximum of 395,350 pounds per square inch.

These pressures being well within the limits sustainable by the materials employed without any risk of either exceeding the elastic limits or the ultimate static strengths thereof, it was indicated that a successful instrument could be produced by utilizing this choice of materials.

Since it was known from the beginning that the disk of an integrator of this type should have a smooth finish on its face, a lapped finish smoothed within 15 micro-inches was specified, this having proved satisfactory on integrators employing steel disks; the purpose being to obviate any appreciable stress increases due to minute surface elevations which, as is well known, tend to fatigue the metals employed by causing transient stress changes which eventually result in breaking down of the surfaces. With respect to the structure of the disk itself, such a specification of smoothness of the surface finish was found adequate, since no permanent deformation was evinced and many millions of input revolutions induced no appreciable wear.

However, an instrument constructed in accordance with these specifications was from a practical viewpoint a total failure, because although the original 15 micro-inch finish was satisfactory with respect to the maintenance of the integrity of the structure of the disk itself, the steel balls in contact with the disk, although of a hardness of approximately Rockwell C64–67, were sufficiently softer than the tungsten carbide of the disc facing 19 so that they were abraded to a degree sufficient to cause their failure in as little as one-half million input revolutions, and those which survived to a million input revolutions had lost their original luster and had assumed a dull finish similar to that of the disk facing.

Perceiving that during the experimental operation of integrators of the construction described above, the disk communicated the quality of its finish to the upper ball, tungsten carbide faced disks were prepared with a superfinish superior to the original superfinish of the balls, and it was found that when the cemented tungsten carbide face 19 of the disk 10 was finished to a smoothness of the order of one micro-inch and an integrator embodying such a disk was experimentally operated as hereinabove described, the balls 30 actually improved in finish under operation until after a few million ball revolutions they had assumed the smooth brilliance of the disk facing. Contrary to what might have been expected from the superfinishing of the disk facing to this extent, however, it was found that the effective torque transmission between the disk face 19 and the upper ball 30 did not fall as much as it might have been expected to fall due to the application of the extremely high superfinish, but remained sufficiently high to maintain the transmissible torque between the input shaft 11 and the output shaft 21 substantially as high as it was capable of being maintained by the use of alloy steel disks under corresponding pressure; such alloy steel disks being incapable, however, of functioning effectively under such pressures because of their lack of strength sufficient to resist the extremely high unit pressures involved.

It is believed, therefore, that the effect obtained by employing a superfinish of the order of one micro-inch on the face of the disk element of an integrator of the type described is not only to eliminate abrasion of the ball elements which is sufficient to cause their breakdown when cemented tungsten carbide disks superfinished to only 15 micro-inches smoothness are used, but also to bring into play the forces of molecular adhesion to a sufficient degree to offset the decrease in the ordinarily effective coefficient of friction and produce a resultant torque transmission sufficiently high to avoid irregular slippage over a wider range of imposed output torques than has been heretofore obtainable with any instrument of this type.

It will be understood that the present invention is capable of embodiment in integrators varying in structural details from that disclosed herein, and that the invention is therefore not to be considered as restricted to the specific form illustrated and described except as required by the proper interpretation of the appended claims.

What is claimed is:

1. A computing integrator having a rotatable disk, a cylinder rotatable on an axis normal to the axis of rotation of said disk, and driving means between said disk and cylinder including a sleeve adjustable axially of said cylinder and radially of said disk and a pair of balls disposed within said sleeve and respectively in driving engagement with said disk, said cylinder and each other; characterized by the provision of a driving face on said disk having a superfinish of a smoothness of the order of one micro-inch and having a hardness of the order of that of cemented tungsten carbide.

2. A computing integrator according to claim 1 in which said balls have their surfaces superfinished to a smoothness of the order of two microinches and said sleeve is provided with an interior, ball-contacting surface superfinished to a smoothness of the order of two microinches and having a coefficient of friction, with respect to said balls, corresponding substantially to that of a hard chromium surface and a minimum thickness of the order of .003 of an inch.

3. In a variable speed transmission of the character described including a pair of members disposed in driving engagement with each other; at least one of said members being circular in a cross-section taken in a plane at a right angle to the plane in which it engages the other of said members, and means for causing one of said members to roll over the surface of the other in a path constantly changing in direction; the improvement comprising the provision of a driving face on one of said members having a superfinish of a smoothness of the order of one microinch and having a hardness of the order of that of cemented tungsten carbide.

4. In a variable speed transmission having a rotatable input disk, output means rotatable about an axis other than that of said disk; and driving means disposed between said disk and said output means, comprising torque-transmitting means disposed in driving engagement between said disk and said output means, and means adjustable relative to said disk and said output means for controlling the position of said torque-transmitting means; the improvement comprising providing a surface on said disk having a hardness of the order of that of a cemented carbide, finishing said surface to a smoothness of the order of one microinch, and substantially increasing the unit pressure between said surface and said torque-transmitting means.

5. In a variable speed transmission having a rotatable disk, output means rotatable about an axis other than that of said disk; and driving means disposed between said disk and said output means, comprising torque-transmitting means disposed in driving engagement between said disk and said output means, and means adjustable radially of said disk and axially of said output means for controlling the position of said torque-transmitting means; the improvement comprising providing a facing on said disk having a hardness of the order of that of a cemented carbide, finishing said facing to a smoothness of the order of one microinch, and increasing the unit pressure between said facing and said torque-transmitting means to a value in excess of 400,000 pounds per square inch.

6. A computing integrator having a rotatable disk, a cylinder rotatable on an axis normal to the axis of rotation of said disk, and driving means between said disk and cylinder including a sleeve adjustable axially of said cylinder and radially of said disk, and a pair of balls disposed within said sleeve and respectively in driving engagement with said disk, said cylinder, and each other; characterized by the provision of a driving face of cemented tungsten carbide on said disk having a superfinish of a smoothness of the order of one microinch.

7. In a variable speed transmission of the character described including a pair of members disposed in driving engagement with each other; at least one of said members being circular in cross-section taken in a plane at a right angle to the plane in which it engages the other of said members, and means for causing one of said members to roll over the surface of the other in a path constantly changing in direction; the improvement comprising the provision of a driving face of cemented tungsten carbide on one of said members, said driving face having a superfinish of a smoothness of the order of one microinch.

8. In a variable speed transmission having a rotatable input disk, output means rotatable about an axis other than that of said disk; and driving means disposed between said disk and said output means comprising torque transmitting means disposed in driving engagement between said disk and said output means, and means adjustable relative to said disk and said output means for controlling the position of said torque transmitting means; the improvement comprising providing a surface of cemented carbide on said disk, finishing said surface to a smoothness of the order of one microinch, and substantially increasing the unit pressure between said surface and said torque transmitting means.

WILLARD JOHN OPOCENSKY.
LEWIS WILLIAM IMM.

REFERENCES CITED

The following references are of record in the file of this patent:

UNITED STATES PATENTS

| Number | Name | Date |
|---|---|---|
| 761,384 | Lambert | May 31, 1904 |
| 953,308 | Waite | Mar. 29, 1910 |
| 2,027,788 | Ridgway | Jan. 14, 1936 |
| 2,248,072 | Fry | July 8, 1941 |
| 2,352,346 | Schiffe | June 27, 1944 |
| 2,357,035 | Treese et al. | Aug. 29, 1944 |
| 2,426,584 | Baker | Sept. 2, 1947 |
| 2,487,256 | Miller et al. | Nov. 8, 1949 |

FOREIGN PATENTS

| Number | Country | Date |
|---|---|---|
| 561,237 | Great Britain | May 11, 1944 |

OTHER REFERENCES

"Superfinish," by Swigart, Lynn Publishing Co., Detroit, 1940.